Patented Nov. 19, 1935

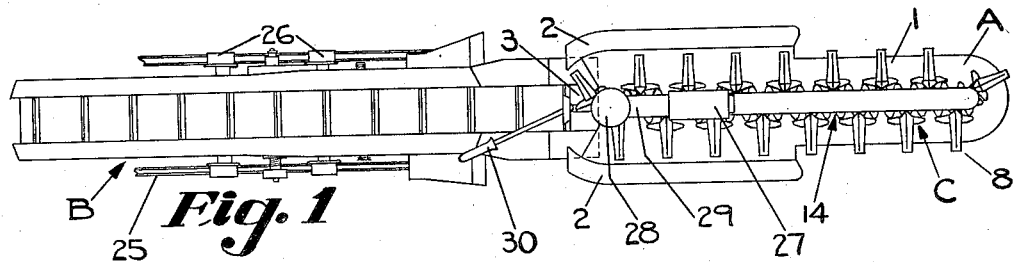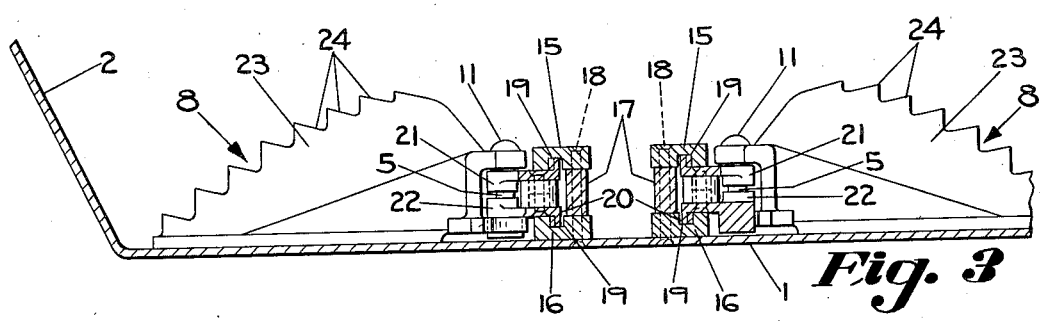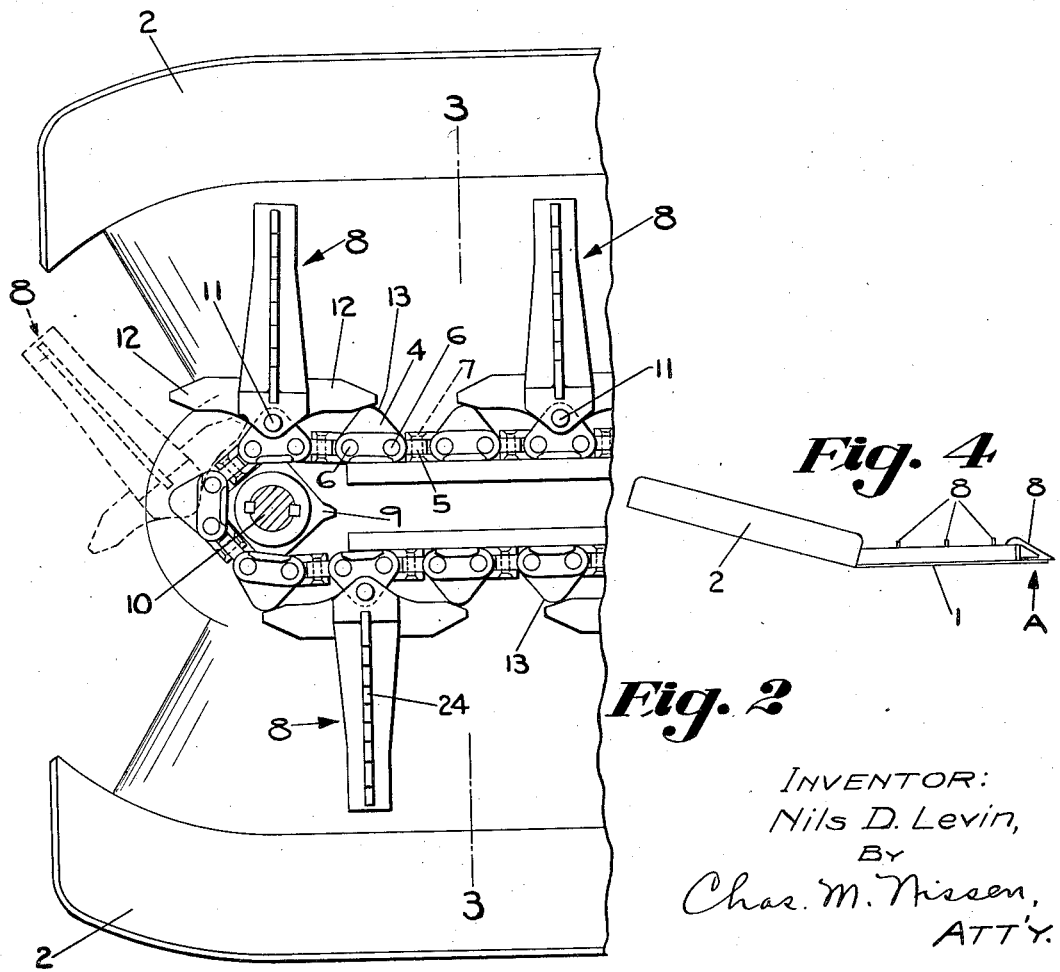

2,021,453

UNITED STATES PATENT OFFICE 2,021,453

MATERIAL HANDLING MECHANISM

Nils D. Levin, Columbus, Ohio, assignor to The Jeffrey Manufacturing Company, a corporation of Ohio Application July 15, 1933, Serial No. 680,592

17 Claims. (Cl. 198—171)

In material handling operations, such as, for example, where the material to be handled is in a loose condition, as where, as is illustrated, coal has been shot down in mining operations, there are frequently employed machines comprising gathering devices for gathering the loose material and transporting the gathered material to loading devices, whereby the loose coal is expeditiously removed from the vicinity of the working face and transported and discharged into mine cars or other conveyances whereby it may be quickly removed from the mine.

While the above indicated operations are of the nature for which the present improved machine is primarily designed, it will be understood that its use is by no means limited to such a particular connection, but that it may be employed in any given instance where material of a loose character is to be handled.

Machines of this general type usually embrace a substantially horizontal conveyor section equipped with gathering instrumentalities for acting upon the loose material and bringing the same into operative engagement with the conveying devices. This conveyor section has its delivery end arranged above the receiving end of a discharge or rear conveyor, the latter being supported for pivotal movement about a vertical axis intermediate its ends. The receiving end of this second conveyor usually is formed into a hopper for receiving the material from the forward conveyor.

The present invention deals with the forward or gathering section of the apparatus, and more specifically with the conveyor instrumentalities employed in connection with this section. In the previous apparatus of this type, there has been difficulty experienced in the transferring of the material from the gathering section into the hopper of the loading section, the conveyor of the gathering section tending to throw the material at the intersection of the two sections, beyond the limits of the hopper of the loading section. This results, obviously, in a scattering of the material, with attendant tendency to loss or wastage thereof, and with the inevitable inconvenience due to the necessity of re-gathering this scattered material. This action may be understood more clearly when it is recalled that the conveyor instrumentalities of the gathering section include an endless conveyor chain mounted on a sprocket at each end of the conveyor trough in which the chain operates, these sprockets being mounted vertically, so that the chain is swung in a horizontal direction at each end of the conveyor trough. The material is actually gathered and conveyed through the trough by the action of conveyor flights or vanes pivotally mounted on suitable links in the conveyor chain, and when the direction of travel of these flights is changed at the end sprockets through which the chain is operated, there has been a tendency of the vanes to whip around the sprockets so as to forcibly project the material conveyed by the flights beyond the limits of the receiving hopper of the loading section.

The present invention provides a means for lessening this whipping action of the flights, thereby lessening the throwing effect thereof upon the material as it is discharged into the aforesaid receiving hopper of the loading section.

The means employed to accomplish this desirable effect are very simple, and include devices which tend to retard the velocity of the swinging effect produced on the conveyor flights as the chain's direction is changed.

The details of the invention will be clearly understood from the following detailed description taken in connection with the accompanying drawing in which:

Fig. 1 represents a more or less diagrammatic plan view of a machine of the general type above discussed, and embracing the improvements of the present invention;

Fig. 2 is an enlarged plan view of a fragment of the gathering section of the machine taken adjacent the discharge end of the section, and showing the details of the improved mechanism;

Fig. 3 is a sectional view taken on the line 3—3 of Fig. 2.

Fig. 4 is a diagrammatic side elevation of the forward or gathering conveyor, the view illustrating an upwardly sloping bottom portion with which the conveyor is provided.

Referring more particularly to the drawing, the machine as illustrated embraces a gathering section A and a loading section B, the latter being adapted to receive loose material of any character gathered by the section A and carried therethrough by conveyor instrumentalities C for discharge into the loading section B. Sections A and B are pivotally interconnected.

The present invention is concerned principally with the improvement in the conveyor instrumentalities employed in section A.

It will be observed that section A includes a forwardly narrowing bottom 1, the rear section of which is upwardly inclined, and side walls 2, these side walls extending from the discharge end 3 of section A forwardly of the section to the point where the bottom 1 narrows.

It will therefore be seen that the section A is essentially an open trough, the side walls of which terminate a substantial distance short of the bottom which extends forwardly a sufficient distance to afford effective support and driving means for the conveyor instrumentalities C.

These conveyor instrumentalities include a conveyor chain made up of links 4 and 5, pivoted together alternately for vertical and horizontal adjustment. For this purpose links 4 are interconnected with each adjacent link 5 by vertical pivot pins 6, the links 5 in turn being formed of two sections pivotally interconnected by a horizontal pivot 7. On certain of the links 4 of the conveyor chain are mounted the conveyor flights 8, which serve to gather the material and to bring it into the limits of the trough of the section A.

It is for this purpose that the bottom 1 of the section A is given its narrowed configuration, since the length of the flights 8 is such that these flights project substantially beyond the edges of the narrowed bottom 1, and thus can scrape the material deposited on the floor or bottom of a mine room or pit or other location upon which the loose material is piled, so that the said loose material will be drawn into the trough of the section A, in an obvious manner, and to transport it through the trough until it is discharged at the end 3 into the loading section B of the machine.

Adjacent the ends of the discharge end 3 is a sprocket 9, operating on the vertical shaft 10, the teeth of the sprocket engaging the links of the conveyor chain to drive the chain. It will be seen therefore that there is a normal tendency of the flights 8 to whip around this sprocket. This action would be intensified if the flights were rigidly mounted on the chain.

To prevent this whipping action with attendant projection of the material being conveyed beyond the limits of the loading end of the loading section B, each flight 8 is freely pivoted, as indicated at 11, to one of the links 4 of the chain. These links 4 are made roughly triangular in shape, the flights being pivoted at the apex of the triangle, which apex is in each instance rounded to provide a cam surface 13.

Each flight 8 is provided, moreover, with laterally projecting lugs or wings 12 which are adapted to engage the cam surfaces 13 of adjacent links 4. It will be noted that the ends of the lugs 12 are also cammed, to cooperate with the cam surfaces 13. These cooperating surfaces therefore provide a means for progressively reducing the speed of the flights as they reach discharging position, the flights yielding gradually under the weight of the material as the chain and flights pass around the sprocket 9, thereby preventing forcible throwing of the material through the discharge end of the conveyor trough.

It will therefore be seen that as the flights travel through the conveyor section, the weight of the material being conveyed will tend to press the flights rearwardly around the pivot points 11, and will maintain the lugs 12 continuously in engagement with adjacent cam surfaces 13.

It will therefore be seen that as the open discharge end of the section A is reached, each flight will take the position of that illustrated in dotted lines in Fig. 2, so that instead of whipping around the sprocket 9, the flight will be gradually turned backwardly around its pivot 11 and the rear lug 12 maintained in engagement with its adjacent cam surface 13 until the material is completely discharged. In this way the objectionable whipping action previously referred to is prevented, and the material is transferred without excessive force from the section A into section B.

This construction adds materially to the safety of the conveyor, particularly when the sections A and B are disposed at right angles to each other, as the whipping action referred to above may throw large lumps of material beyond the limits of the conveyor trough with sufficient force to injure anyone standing in range. The elimination of this throwing action of course removes this danger hazard.

It will be observed that the links of the conveyor chain are guided in the course of their travel by guides 14. These guides include top and bottom members 15 and 16, respectively, and a side wall member 17 holding the members 15 and 16 in proper spaced relation, these members being secured to the wall members 17 by a rivet, or equivalent securing member 18 passing through the guide structure and into the bottom 1 of the conveyor section. The top and bottom members are each grooved with a continuous groove, indicated at 19, which grooves cooperate to form a track in which the oppositely extending lugs 20 of the chain links travel.

As will be specifically seen from Fig. 3, the links 4 are formed of top and bottom parts 21 and 22, respectively, of similar shape, between which is pivotally interconnected the end of the adjacent link 5.

The flights 8 are formed with an upstanding web 23, the edge of which is notched as indicated at 24 for reducing the weight of the conveyor. These notches or teeth perform the additional function of serving to penetrate into and grip the material being acted upon. For example, in coal mining operations when the blasting charges intended to break down the face of the coal being worked are fired, it sometimes happens that the coal is not broken sufficiently to fall. In such instances, the penetrating action of the teeth 24 as the flights are brought into engagement with the loosened mass of coal, will cause a complete fall of the surface of the coal.

It will be noted that the conveyor section B is mounted on a track 25 through wheels 26 and that the conveyor C is driven by a motor 27 operating a gear 28 through driving connections 29, power for the motor being supplied through a conductor 30. The details of this drive mechanism are described in the co-pending application of Nils D. Levin and Edward G. Lewis, Ser. No. 476,390, filed August 19, 1930.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. Material handling mechanism comprising the combination with a conveying trough of a conveyor operating through the trough, the conveyor including a chain, flights pivotally mounted on the chain the flights being provided with oppositely extending arms directed substantially parallel to the straight portions of the chain, and cam members secured to the chain and intermediate the chain and said arms for holding the flights rigidly relative to the chain during straight travel of the chain while enabling limited movement of the flights relative to the chain as the direction of travel of the chain changes.

2. Material handling mechanism comprising the combination with a conveyor trough, of a conveyor chain acting through the trough, of means on the conveyor chain for preventing throwing of material away from the trough during discharge of material from the trough, the said means including conveyor flights pivotally mounted on the conveyor chain, and devices on the chain cooperating with the flights for maintaining the flights rigid relative to the conveyor chain during rectilinear movement of the conveyor chain while enabling rearward movement of the flights relative to the conveyor chain incident to change in direction of travel of the said conveyor chain.

3. Material handling mechanism comprising the combination with a conveyor trough, of a conveyor chain acting through the trough, of means on the conveyor chain for preventing throwing of material away from the trough during discharge of the material from the trough, the said means including conveyor flights pivotally mounted on the conveyor chain, and cam surfaced lugs engaging the flights forwardly and rearwardly of the flights for maintaining the flights rigid relative to the conveyor chain during rectilinear movement of the conveyor, the flights becoming disengaged from the forward lug as the chain changes direction of travel as the material discharges, while being maintained in continuous engagement with the cam surface of the rear lug thereby preventing whipping motion of the flight during discharge of material.

4. An article of manufacture comprising a conveyor flight and oppositely extending wings on the flight, each of the said wings being provided with a portion perpendicular to the axis of the flight and a free end having a cam surface at an angle thereto.

5. Material handling mechanism comprising the combination with a conveying trough, of a conveyor operating through the trough, the conveyor including a chain having generally triangular links forming cams, and flights pivotally mounted on certain of the links and having oppositely extending arms provided with cam surfaces engaging the aforesaid cams and being held thereby so that the flights are firmly supported at substantially right angles to the chain during straight travel of the chain while enabling a substantial and continous yielding of the flight relatively to the chain as the direction of travel of the chain is changed to prevent a whipping action of the flights during change in direction of travel of the chain.

6. Material handling mechanism comprising the combination with a conveying trough, of a conveyor operating through the trough, the conveyor including a chain having flat cam-shaped pivotally interconnected links, flights pivotally mounted on certain of the said links and having oppositely extending arms provided with cam surfaces for cooperation with the cam-shaped links, the cam-shaped links engaging the said arms for holding the flights rigidly relatively to the chain during straight travel of the chain, while enabling a continuous variation of inclination of the flights relative to the chain as the direction of travel of the chain is changed, the said variation of inclination being sufficient to prevent a whipping action of the flights during change in direction of travel of the chain.

7. Material handling mechanism comprising the combination with cooperating sections adapted to receive material fed progressively therethrough, of conveying devices including a conveyor chain, fllights therefor, wings on said flights, means interconnecting the chain and flights, and means including cams on parts of the chain cooperating with said wings for holding the flights rigidly extended from the chain during rectilinear travel thereof while enabling sufficient pivotal movement of the flights relative to the chain as the chain changes its direction of travel to prevent whipping action of the flights incident to such change in direction during discharge of material handled by the conveying devices.

8. Material handling mechanism comprising the combination with cooperating sections adapted to receive material fed progressively therethrough, of conveying devices including a conveyor chain, flights therefor, means interconnecting the chain and flights and means including links of the chain and oppositely extending arms on the flights engaging the said links for holding the flights rigidly extended from the chain during rectilinear travel thereof while enabling sufficient yielding of the flights relative to the chain as the chain changes its direction of travel to prevent a whipping action of the flights incident to such change in direction during discharge of material handled by the conveying devices.

9. As an article of manufacture, a chain link having a body provided with spaced in pin holes at each end and a cam extending from said body laterally of a longitudinal line passing through the axes of said holes.

10. As an article of manufacture, a chain link having a body and a cam having a curved bearing surface and extending laterally of said body.

11. In a conveyor, a chain formed of connected links, at least some of said links having a body provided with spaced pin holes at each end and a cam extending from said body laterally of a longitudinal line passing through the axes of said holes.

12. In a conveyor, a chain formed of connected links, at least some of said links comprising a body and a cam having a curved bearing surface extending laterally of said body.

13. In a conveyor, the combination with a pair of spaced sprockets one of which is at the discharge end of said conveyor, of an endless chain extending between said sprockets, driving means for said chain, a flight pivoted to a link of said chain about a vertical axis, said flight being adapted to move material, an arm extending from said flight, a cam carried on another link of said chain adapted to cooperate with said arm to restrict pivotal movement of said flight in one direction under the force of the load moved by said flight, said cam and arm allowing pivotal movement of said flight relative to said chain in said one direction as the chain engages said sprocket at the discharge end of said conveyor.

14. In a conveyor, the combination with an endless chain supported for travel between the material receiving and material discharging ends of a conveyor, of driving means therefor, a material conveying flight pivoted to a link of said chain and adapted to pivot about a vertical axis, an arm extending rearwardly of said flight, a cam carried by another link of the chain which cooperates with said arm to restrict rearward pivotal movement of said flight during rectilinear travel of said chain and permits rearward pivotal movement of said flight relative to said chain as the latter changes its direction of travel adjacent the discharge end of the conveyor.

15. In a conveyor, the combination with an endless chain, of means supporting said chain for travel between the material receiving and material discharging ends of a conveyor including a sprocket at said material discharge end, flights pivotally attached to links of said chain, arms on said flights adapted to contact other chain links to restrict pivotal movement of said flights during rectilinear travel of said chain, said sprocket being of small diameter whereby the longitudinal axes of the chain links will make a sharp angle with respect to each other as the chain rounds the said sprocket thereby permitting appreciable free pivotal movement of said flight at said discharge end of the conveyor.

16. In a conveyor, the combination with a chain, of a flight pivoted to a link of said chain, wings extending laterally from the base of said flight adapted to contact forward and rearward links of said chain and to be maintained against appreciable pivotal movement while said links are rectilinear, and means for making relatively sharp angles between said links in changing the direction of travel of said chain whereby appreciable pivotal movement of said flight is permitted.

17. In material handling mechanism, the combination with a conveyor trough having a discharge outlet, of a conveyor chain in said trough, means for changing the direction of travel of said chain adjacent said discharge outlet, and means on the conveyor chain for preventing throwing of material away from the trough during discharge of material from said trough, the said means including conveyor flights pivotally mounted on the conveyor chain, and devices on the chain cooperating with the flights for maintaining the flights relatively rigid with respect to the conveyor chain during rectilinear movement of the conveyor chain while enabling rearward movement of the flights relative to the conveyor chain incident to change in direction of travel of said conveyor chain and while material is being discharged.

NILS D. LEVIN.